US008803978B2

(12) United States Patent
Wilson

(10) Patent No.: US 8,803,978 B2
(45) Date of Patent: Aug. 12, 2014

(54) COMPUTER VISION-BASED OBJECT TRACKING SYSTEM

(75) Inventor: Andrew Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1740 days.

(21) Appl. No.: 11/439,453

(22) Filed: May 23, 2006

(65) Prior Publication Data

US 2007/0273766 A1  Nov. 29, 2007

(51) Int. Cl.
*H04N 5/225* (2006.01)

(52) U.S. Cl.
USPC ........................................................ 348/169

(58) Field of Classification Search
USPC ................................................. 348/143–169
See application file for complete search history.

(56) References Cited

U.S. PATENT DOCUMENTS

| | | | | |
|---|---|---|---|---|
| 5,164,585 | A | | 11/1992 | Lieu .............................. 250/221 |
| 5,297,061 | A | | 3/1994 | Dementhon ................... 345/180 |
| 5,604,999 | A | * | 2/1997 | Barker ............................. 36/137 |
| 5,610,653 | A | * | 3/1997 | Abecassis ...................... 348/170 |
| 5,945,981 | A | | 8/1999 | Paull ............................ 345/180 |
| 6,437,819 | B1 | * | 8/2002 | Loveland ...................... 348/143 |
| 6,553,682 | B1 | | 4/2003 | Willoughby .................... 33/561 |
| 6,677,941 | B2 | | 1/2004 | Lin ............................... 345/419 |
| 6,801,637 | B2 | * | 10/2004 | Voronka et al. ............... 382/103 |
| 6,944,317 | B2 | * | 9/2005 | Pavlovic et al. .............. 382/107 |
| 7,664,292 | B2 | * | 2/2010 | van den Bergen et al. ... 382/103 |
| 2001/0019357 | A1 | * | 9/2001 | Ito et al. ........................ 348/152 |
| 2003/0003925 | A1 | * | 1/2003 | Suzuki .......................... 455/456 |
| 2003/0095186 | A1 | * | 5/2003 | Aman et al. ................... 348/162 |
| 2003/0197790 | A1 | * | 10/2003 | Bae .......................... 348/211.99 |
| 2003/0201380 | A1 | * | 10/2003 | Ockerse et al. ............. 250/208.1 |
| 2004/0041912 | A1 | * | 3/2004 | Zeng ........................... 348/207.1 |
| 2006/0043188 | A1 | | 3/2006 | Kricorissian ............. 235/462.08 |
| 2006/0245649 | A1 | * | 11/2006 | Chen et al. .................... 382/173 |

FOREIGN PATENT DOCUMENTS

| | | |
|---|---|---|
| WO | WO 0101685 | 1/2001 |
| WO | WO 0114955 | 3/2001 |

OTHER PUBLICATIONS

Student Paper : Munich, M.; Visual Input for Pen-Based Computers, http://www.vision.caltech.edu/mariomu/research/pentrack, pp. 1-3.
Agarawala, A.; Super Skewer: A 3D input device based on infrared LEDs that are tracked by multiple cameras. Project Proposal. http://pages.cpsc.ucalgary.ca/~anand/cpsc502/03-Project_Proposal.htm, pp. 1-6.

* cited by examiner

*Primary Examiner* — Dave Czekaj
*Assistant Examiner* — Tracy Li
(74) *Attorney, Agent, or Firm* — Dan Choi; Carole Boelitz; Micky Minhas

(57) ABSTRACT

A computer-implemented method for utilizing a camera device to track an object is presented. As part of the method, a region of interest is determined within an overall image sensing area. A point light source is then tracked within the region of interest. In a particular arrangement, the camera device incorporates CMOS image sensor technology and the point light source is an IR LED. Other embodiments pertain to manipulations of the region of interest to accommodate changes to the status of the point light source.

20 Claims, 4 Drawing Sheets

COMPUTER VISION-BASED OBJECT TRACKING SYSTEM

BACKGROUND

When tracking an object using computer vision techniques, it can be desirable to place an active light emitting diode (LED) on the object to be tracked. Thus, the object can be tracked by tracking corresponding characteristics of the light source. This simplifies the image-processing task of finding the object in an image. It also reduces or eliminates ambiguity in terms of determining which object in an image is the object to be tracked. The tracking process can be simplified even further by using infrared (IR) LEDs and IR-sensitive cameras. In this case, the IR LED may be the only item visible in the scene.

Currently, the effectiveness of tracking an object by tracking an associated light source is limited because cameras are limited to a relatively low frame acquisition rate, such as a rate in the range of 30-60 Hz. Thus, such systems are generally unable to capture large or quick motions. Further, such systems typically exhibit high latency (latency is bounded by frame rate). Applications that might involve large and/or quick movements such as, but not limited to, music synthesis and video game controllers would benefit from higher frame rates.

The discussion above is merely provided for general background information and is not intended for use as an aid in determining the scope of the claimed subject matter.

SUMMARY

A computer-implemented method for utilizing a camera device to track an object is presented. As part of the method, a region of interest is determined within an overall image sensing area. A point light source is then tracked within the region of interest. In a particular arrangement, the camera device incorporates CMOS image sensor technology and the point light source is an IR LED. Other embodiments pertain to manipulations of the region of interest to accommodate changes to the status of the point light source.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
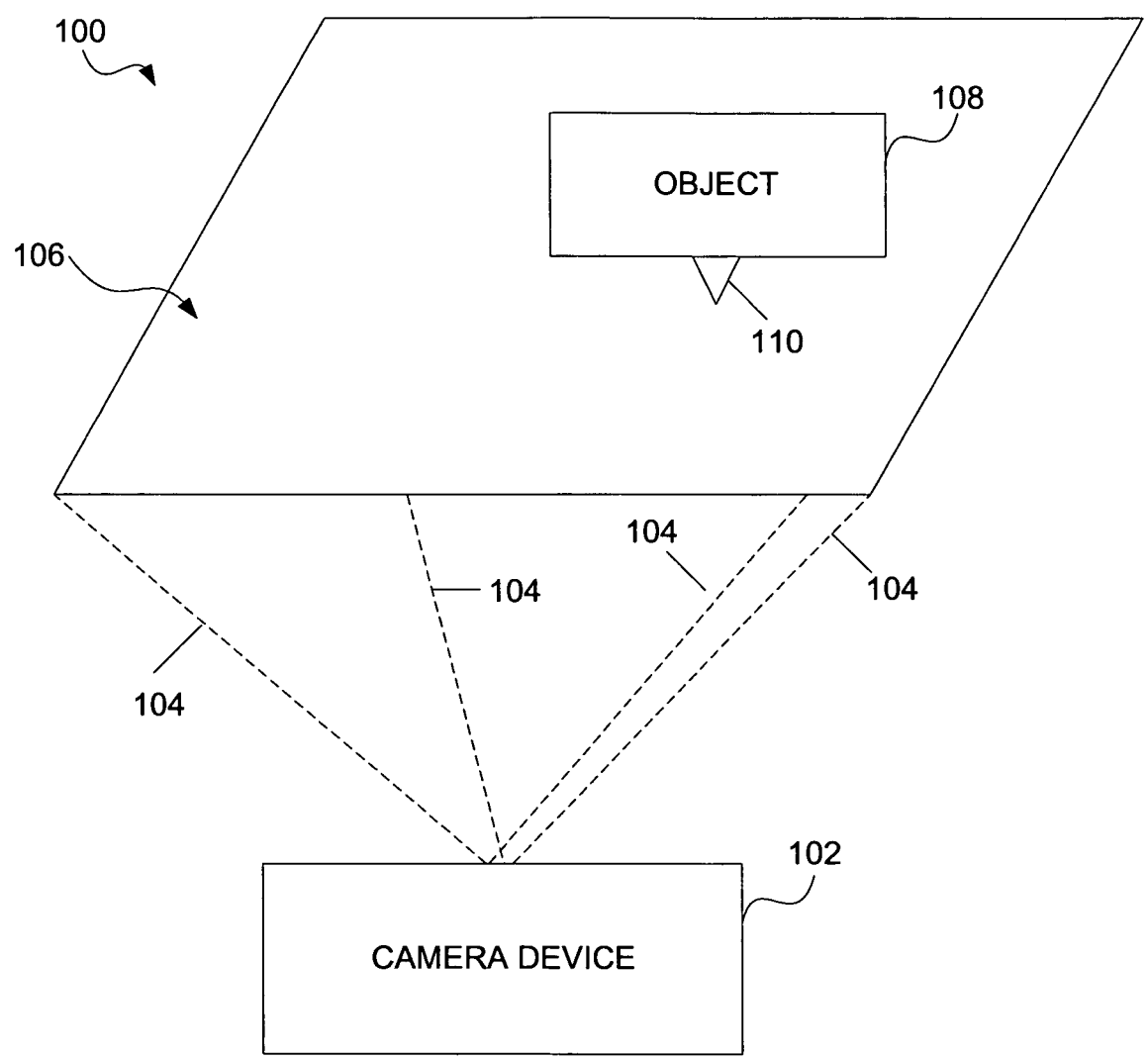
FIG. 1 is a schematic block diagram of one environment in which some embodiments may be practiced.

FIG. 1 is a schematic block diagram of one environment in which some embodiments may be practiced. More specifically, FIG. 1 depicts a computer vision-based object tracking system 100. It should be noted that the present invention is not limited to the computer vision system illustrated in FIG. 1. System 100 is but one example of a suitable environment in which embodiments may be implemented. System 100 is not intended to suggest any limitation as to the scope of use or functionality of various embodiments. Neither should system 100 be interpreted as having any dependency or requirement relating to any one or combination of components illustrated in the exemplary environment.

System 100 includes a camera device 102 that, as is generally indicated by lines 104, has a field of vision focused upon a portion of a surface 106. Those skilled in the art will appreciate that the field of vision can be adjusted through manipulation of imaging components, such as through adjustment of the focus of one or more lenses. Such lenses may or may not be directly incorporated into camera device 102.

In general, camera device 102 is configured to facilitate application of computer vision techniques to support a gathering of data related to the positioning of an object 108. Surface 106 may be transparent such that object 108 is observable by camera device 102 when placed within the associated field of vision. Depending on the technical capacity of camera device 102 (e.g., ability to re-focus or change the field of view, etc.), the ability to track motion of object 108 may be limited to movements wherein object 108 is kept in relatively close proximity to surface 106. However, depending on the technical capacity of camera device 102, it is possible to eliminate surface 106 from the system completely such that the position of object 108 can be tracked at multiple distances from device 102, including various distances other than the distance associated with surface 106.

For any of a variety of reasons, such as to eliminate ambiguity in the object to be tracked, or to simplify the processing task of finding the target object in the image, a light source 110 (e.g., an LED) is added to object 108. Camera device 102 then tracks object 108 by tracking light source 110. In one embodiment, not by limitation, light source 110 is an IR LED and camera device 102 is an IR-sensitive camera. This even further simplifies the tracking of object 108. Of course, surface 106 is assumed to be transparent to the light emitted from light source 110.

The effectiveness of tracking object 108 by tracking light source 110 is at least partially contingent upon the frame acquisition rate supported by camera device 102. For example, if the frame acquisition rate is in the range of 30-60 Hz, then camera device 102 will not likely be able to effectively capture large or quick movements of object 108. Further, if the frame acquisition rate is low, then latency very well may be undesirably high because latency is generally bounded by frame rate.

Applications that might involve large and/or quick movements would benefit from support for higher frame rates. For example, systems designed to track input made upon a screen with an electromagnetic stylus have specified sample collection at 133 Hz to achieve smooth capture of strokes for handwriting recognition, drawing, etc. Other applications such as, but not limited to, music synthesis and video game controllers may also require a relatively high frame acquisition rate.

Camera device 102 is illustratively configured to increase or maximize the frame acquisition rate by exploiting sensor technology that enables specification of an active region of interest (ROI) in the overall image sensing area. In one embodiment, this is accomplished through implementation of Complementary Metal Oxide Semiconductor (CMOS) image sensor technology. CMOS imagers are effectively limited in the bandwidth of the connection link, not the light gathering electronics on the imager itself. Thus, the frame acquisition rate is related to the size of the ROI. A CMOS sensor capable of delivering 30 640×480 frames per second will deliver 4*30=120 frames per second with an ROI of 320×240. By reducing the ROI further, frame rates of several hundred Hz or more are possible.

The described approach raises a few issues to consider. First, because pixels are acquired more quickly than is typically the case, the light integration time for each pixel is relatively reduced. This is akin to reducing the "exposure time" of the camera device. It is possible that for small ROIs, everyday indoor scenes will be too dark to be imaged. Incorporation of an active LEDs into an item to be tracked addresses this issue. The brightness of the LED is apparent even at small ROIs.

Another issue to consider is that a small ROI may require active adjustment such that a tracked object will fall within it. In one embodiment, this issue is addressed by calculating an updated position of the ROI and sending the new ROI to the camera interface. Depending on the technical capacity of a given camera implementation (e.g., a given CMOS imaging system), this may involve a loss of one or more frames. To achieve the highest frame rate, the frequency of changing the ROI can be limited, which may in turn require a larger ROI than if changed every frame.

The present description is focused on one example environment wherein a camera is focused on a surface. In one embodiment, a light source implement is configured with a tip-switch such that the light source is active (e.g., the IR LED is on) only when the switch is on the surface. However, those skilled in the art that the same concepts described herein can similarly be applied within a surface-free environment, such as an environment wherein a light source is waved around in front of a camera for a game or some other purpose.

Figure 2:
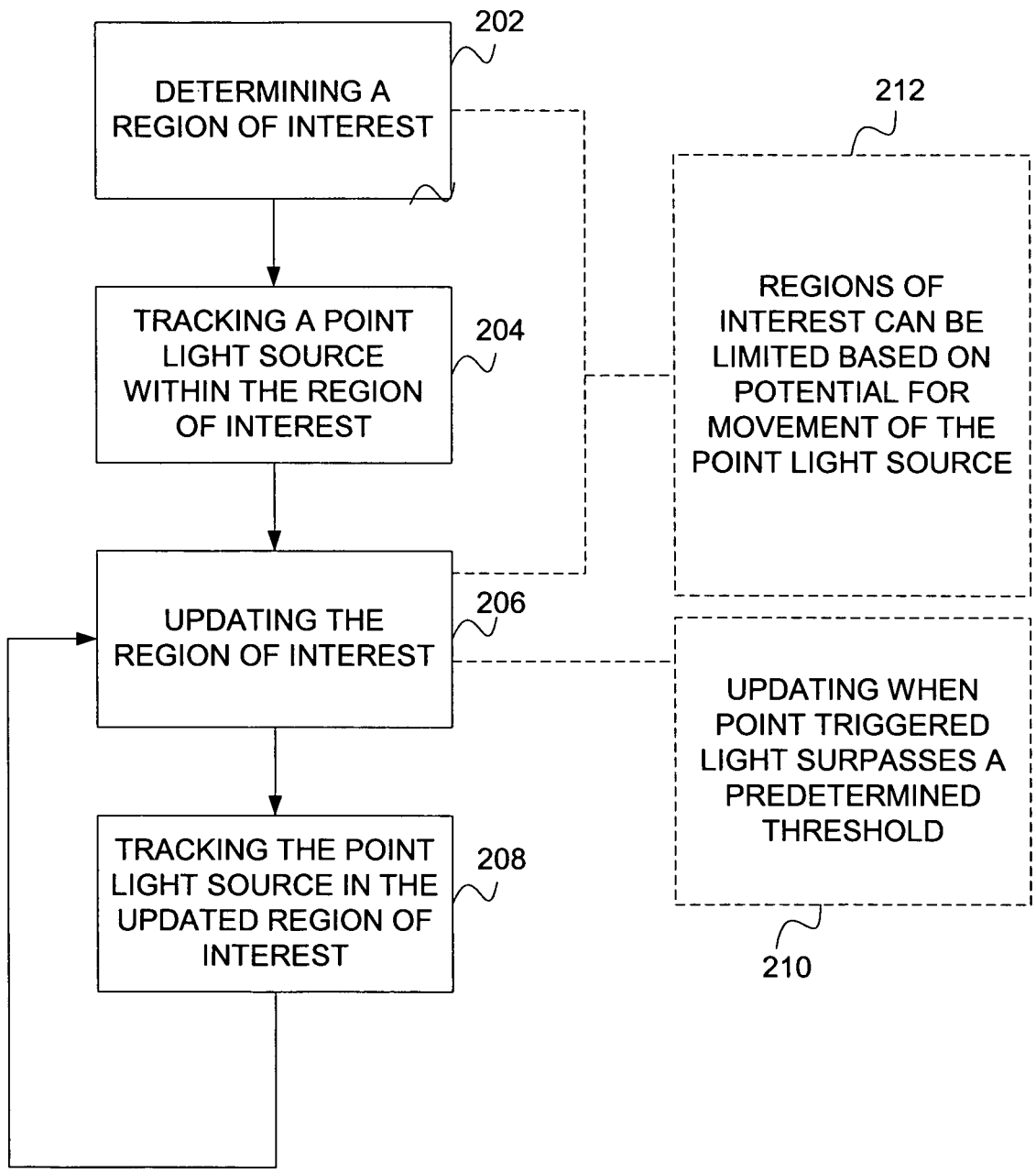
FIG. 2 is a block flow chart illustrating steps associated with tracking a point light source associated with an object.

FIG. 2 is a block flow chart illustrating steps associated with tracking a point light source associated with an object. In accordance with block 202, there is first a determination of an ROI within the overall image sensing area. As is indicated by block 212, the boundaries of the ROI may be based on the potential for movement of the point light source. For example, areas that extend beyond where the light source could move prior to a subsequent re-determination of the region of interest need not be included.

In accordance with block 204, the point light source is tracked within the determined ROI. Block 206 represents an updating or re-determination of the ROI. As noted, the boundaries can again be made contingent on potential for movement. The system can illustratively be configured to perform the re-determination step only under certain circumstances, such as periodically or only when the light source has moved (i.e., if it hasn't moved then re-determination is unnecessary). Further, as is indicated by block 212, re-determination can be made contingent upon movement of the point light source beyond a predetermined threshold. For example, the threshold might be based upon how far movement could potentially occur within a given time period (e.g., a certain number frames, the period between re-determinations of the ROI, etc.). In one embodiment, the region is selected according to a model of the point's motion (e.g., linear motion prediction, Kalman filter, etc.). A better prediction of the point's location supports a smaller ROI and thus a higher frame rate. In accordance with block 208, the updating and tracking steps can be repeated as necessary.

Figure 3:
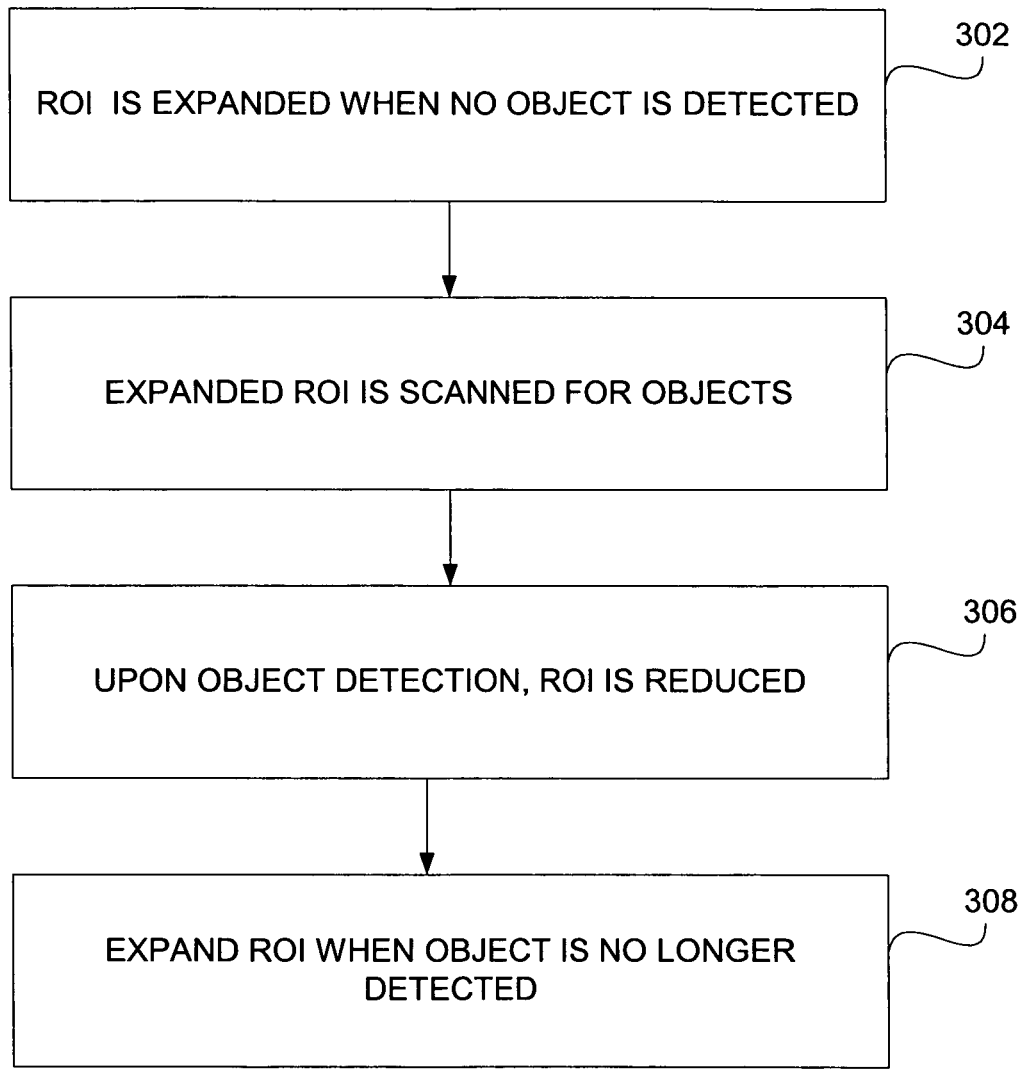
FIG. 3 is a block flow diagram demonstrating steps associated with a process for handling object detection.

It worth pointing out that, with a small ROI, it may be unlikely that the system will detect the appearance of a new object to be tracked. In one embodiment, a specialized algorithm is employed to enhance the system's capacity to detect objects. FIG. 3 is a block flow diagram demonstrating steps associated with a process for handling object detection. In accordance with block 302, when no object (i.e., no point light source) is being actively tracked with a small ROI, then the ROI is enlarged (e.g., to the maximum size). Of course, the frame acquisition rate will correspondingly decrease under the circumstances. In accordance with block 304, expanded ROI is scanned until a new object (i.e., a new point light source) is detected.

In accordance with block 306, upon detection of an object (i.e., the point light source), the ROI is reduced to cover only the object and a corresponding potential range of movement (e.g., the range over which it can move during the small frame time). If, after a time, the object (i.e., the point light source) is not detected in the small ROI, then the system reverts back to the detection phase (e.g., expanded ROI).

Figure 4:
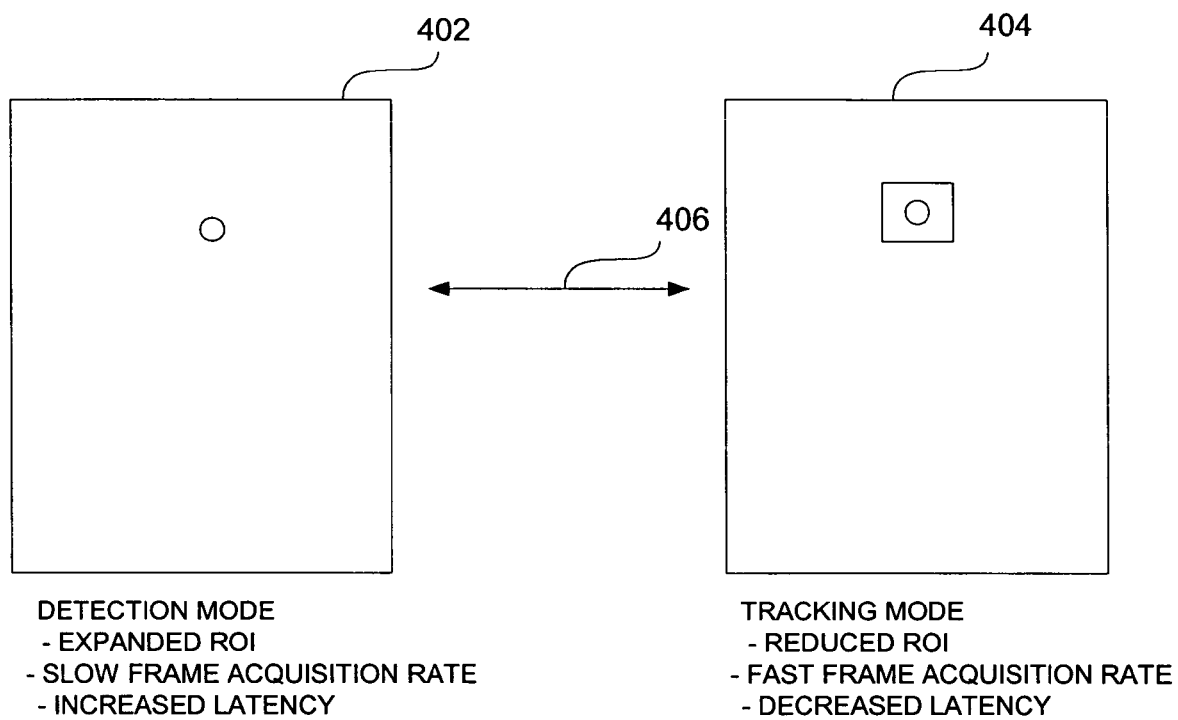
FIG. 4 is a schematic representation visually demonstrating a process for object detection.

FIG. 4 is a schematic representation visually demonstrating a process for object detection. In a detection mode 402, the ROI is expanded, the frame acquisition rate is relatively slow and latency is increased. This is assumedly prior to detection of a point light source associated with an object. Upon detection, the system transitions into tracking mode 404, wherein the ROI is reduced, the frame acquisition rate is increased and latency is reduced. As has been described, in the tracking mode, the ROI is illustratively adjusted to accommodate movement of the object. Arrow 406 demonstrates that the system can switch between the detection mode and tracking mode as necessary.

As an example of a specific implementation, methods such as those described are employed to track the positioning of an active IR LED built into a stylus. Samples are collected at a frame acquisition rate measured in hundreds of HZ (e.g., more than 400 HZ). Thus, the stylus can be used effectively in an inking application. Furthermore, "sub-pixel" tracking techniques can be employed to further improve the quality of the inking functionality. This can be achieved, for example, by calculating the position of the LED as the weighted average of the position of the bright pixels in the ROI, where each weight is the brightness of the pixel.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of utilizing a camera device to track an object, the method comprising:
    utilizing the camera device in a detection mode to detect movement of a point light source associated with the object within an overall image sensing area, the camera device having a first frame acquisition rate in the detection mode;
    switching from the detection mode to a tracking mode in response to the detected movement;
    determining a potential range of movement of the point light source based on a location of the detected movement and a given time period for potential movement of the point light source;
    determining boundaries of a region of interest within the overall image sensing area based at least in part upon the determined potential range of movement of the point light source, wherein the boundaries of the region of interest define an area that is less than the overall image sensing area in the detection mode; and
    utilizing the camera device in the tracking mode, in which a frame acquisition rate of the camera device is increased to a second frame acquisition rate that is higher than the first frame acquisition rate in the detection mode, to track the point light source within the determined boundaries of the region of interest.

2. The method of claim 1, wherein the region of interest is imaged utilizing a CMOS image sensor, and wherein a frame acquisition rate of the CMOS image sensor is dependent upon a size of the region of interest and wherein tracking the light source comprises tracking an IR LED, and wherein the frame acquisition rate of the CMOS image sensor increases as the size of the region of interest decreases.

3. The method of claim 1, wherein the point light source comprises a light emitting device operable to produce light that is received by the camera device, the light emitting device being positioned such that it moves along with the object.

4. The method of claim 1 further comprising re-determining the boundaries of the region of interest when the point light source moves to a location that is beyond a predetermined threshold, and wherein the predetermined threshold is based upon a number of frames.

5. The method of claim 1, and further comprising:
determining that the point light source is not detected within the boundaries of the region of interest and in response, adjusting the boundaries to increase the size of the region of interest.

6. The method of claim 1, and further comprising:
determining that the point light source is detected within the boundaries of the region of interest and in response, adjusting the boundaries to decrease the size of the region of interest.

7. The method of claim 1 further comprising:
detecting movement of the point light source within the region of interest;
determining a movement potential of the point light source based on the detected movement and the given time period; and
re-determining boundaries of the region of interest based on the determined movement potential such that the re-determined region of interest covers the object within an area defined by the movement potential.

8. The method of claim 1 wherein the boundaries of the region of interest are calculated based on the location and the given time period to exclude, from the region of interest, areas that extend beyond the potential movement of the point light source during the given time period, and wherein, when in the tracking mode, the camera device monitors the entire area within the boundaries of the region of interest and portions of the overall image sensing area that are outside the region of interest are not monitored.

9. The method of claim 1 wherein the boundaries of the region of interest are determined using a model relative to movement of the point light source.

10. A computer vision-based object tracking system, the system comprising:
a point light emitting device that is operable to produce light and associated with an object such that the point light emitting device moves when the object moves; and
a camera device configured to receive the light produced by the point light emitting device to track the object, by tracking the point light emitting device within a region of interest that is less than an overall image sensing area, the overall image sensing area comprising a field-of-view of the camera device and the region of interest being a portion of the camera device field-of-view, wherein boundaries of the region of interest are actively adjusted based on a potential range of movement of the point light emitting device, to change a size of the region of interest in response to at least some movement of the point light emitting device the potential range of movement being determined based at least in part on a location of the point light emitting device and a time period for potential movement of the point light emitting device.

11. The system of claim 10, wherein the camera device is configured to track the point light emitting device using a CMOS image sensor, and wherein the camera device has a variable field of vision that enables it to track the point light emitting device at multiple distances from the camera device, the variable field of vision including a focus that is adjustable through imaging components.

12. The system of claim 10, wherein the point light emitting device is an IR LED, and wherein tracking the point emitting device includes changing the field of view.

13. The system of claim 10, wherein the camera device is configured to track the point light emitting device within a different region of interest when the point light emitting device moves to a location that is beyond a predetermined threshold, and wherein the camera device calculates a position of the point light emitting device within the region of interest as a weighted average of positions of bright pixels in the region of interest.

14. The system of claim 10, wherein the boundaries of the region of interest are decreased to reduce the region of interest in response to detected movement of the point light emitting device, and the boundaries of the region of interest are increased to enlarge the region of interest when the point light emitting device is not detected within the region of interest.

15. A computer-implemented method of utilizing a camera device having a field of vision oriented toward a surface to track an object having a point light source and a switch configured to control the point light source, the method comprising:
adjusting a characteristic of a region of interest based on a characteristic of the point light source, wherein the region of interest is a region within an overall image sensing area, and a frame acquisition rate of the camera device varies as a function of a size of the region of interest;
automatically activating the point light source using the switch in response to at least a portion of the object contacting the surface, wherein at least a portion of the light from the activated point light source passes through the surface to the camera device; and
utilizing the camera device to view the activated point light source through the surface while adjusting the characteristic of the region of interest.

16. The method of claim 15, wherein adjusting a characteristic of the region of interest comprises increasing the size of the region of interest when the point light source is not detected within the region of interest, and wherein the frame acquisition rate increases as the region of interest decreases.

17. The method of claim 15, wherein adjusting a characteristic of the region of interest comprises relocating the region of interest along the surface as a function of a location of the point light source and a calculated potential range of movement of the point light source within a given time frame.

18. The method of claim 15, wherein adjusting a characteristic of a region of interest comprises relocating the region of interest along the surface when the point light source moves beyond a predetermined threshold, and wherein utilizing the camera includes reducing a pixel integration time.

19. The method of claim 15, wherein the point light source is an IR LED, and wherein utilizing the camera device includes maintaining a set focus and a set field of view on the surface.

20. The method of claim 15, wherein the surface is at least partially transparent, and the portion comprises at least one of the point light source and the switch.

* * * * *